United States Patent
Yoshikawa

(10) Patent No.: US 12,301,307 B2
(45) Date of Patent: May 13, 2025

(54) COMMUNICATION DEVICE, COMMUNICATION METHOD, AND STORAGE MEDIUM

(71) Applicant: CANON KABUSHIKI KAISHA, Tokyo (JP)

(72) Inventor: Yuki Yoshikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 484 days.

(21) Appl. No.: 17/411,114

(22) Filed: Aug. 25, 2021

(65) Prior Publication Data

US 2021/0384943 A1 Dec. 9, 2021

Related U.S. Application Data

(63) Continuation of application No. PCT/JP2020/004256, filed on Feb. 5, 2020.

(30) Foreign Application Priority Data

Feb. 28, 2019 (JP) .................................. 2019-036401

(51) Int. Cl.
| | |
|---|---|
| *H04B 7/022* | (2017.01) |
| *H04B 7/0413* | (2017.01) |
| *H04B 7/0452* | (2017.01) |
| *H04B 7/06* | (2006.01) |
| *H04L 5/00* | (2006.01) |

(Continued)

(52) U.S. Cl.
CPC ........... *H04B 7/022* (2013.01); *H04B 7/0413* (2013.01); *H04B 7/0697* (2013.01); *H04W 84/12* (2013.01)

(58) Field of Classification Search
CPC .... H04B 7/022; H04B 7/0413; H04B 7/0697; H04W 84/12
USPC ......................................................... 370/329
See application file for complete search history.

(56) References Cited

U.S. PATENT DOCUMENTS

| | | | |
|---|---|---|---|
| 9,826,532 B1 | 11/2017 | Chu et al. | |
| 10,182,361 B1* | 1/2019 | Moon | .................... H04W 24/08 |
| 2016/0242177 A1* | 8/2016 | Seok | ...................... H04L 69/322 |

(Continued)

FOREIGN PATENT DOCUMENTS

JP 2018-050133 A 3/2018

OTHER PUBLICATIONS

Stacey et al ("Proposed TGax draft specification", IEEE P802.11 Wireless LANs, Mar. 2016, retrieved from http://mentor.ieee.org/802.11/dcn/16/11-16-0024-01-00ax-proposed-draft-specification.docx) (Year: 2016).*

(Continued)

*Primary Examiner* — Xuan Lu
(74) *Attorney, Agent, or Firm* — Carter, DeLuca & Farrell LLP

(57) ABSTRACT

A communication device communicates a physical (PHY) frame including a preamble and a data field. The preamble includes a Legacy Short Training Field (L-STF), a Legacy Long Training Field (L-LTF), a Legacy Signal Field (L-SIG), an EHT Signal Field (EHT-SIG-A), an EHT Short Training Field (EHT-STF), and an EHT Long Training Field (EHT-LTF), and the EHT-SIG-A includes a subfield indicating the number of spatial streams which are formed by the communication device and not less than one communication device different from the communication device.

20 Claims, 7 Drawing Sheets

(51) Int. Cl.
*H04L 27/26* (2006.01)
*H04W 84/12* (2009.01)

(56) References Cited

U.S. PATENT DOCUMENTS

| | | | | |
|---|---|---|---|---|
| 2017/0181136 | A1* | 6/2017 | Bharadwaj | H04W 72/12 |
| 2017/0223665 | A1* | 8/2017 | Chun | H04B 7/0456 |
| 2019/0373569 | A1* | 12/2019 | Ram | H04W 56/005 |
| 2020/0059808 | A1* | 2/2020 | Lim | H04W 72/04 |
| 2020/0077351 | A1* | 3/2020 | Porat | H04W 56/0015 |
| 2021/0297189 | A1 | 9/2021 | Yoshikawa | |
| 2021/0307099 | A1* | 9/2021 | Ryu | H04W 76/15 |
| 2021/0351820 | A1* | 11/2021 | Huang | H04B 7/0413 |
| 2021/0368506 | A1 | 11/2021 | Yoshikawa | |

OTHER PUBLICATIONS

International Search Report issued by the Japan Patent Office on Apr. 14, 2020 in corresponding International Application No. PCT/JP2020/004256 with English translation.

Ryu, Ki-Seon, "Consideration on multi-AP coordination for EHT" IEEE 802 . 1118/1982r1, <URL : https : / / mentor . ieee . org/ 802 . 11/ don/ 18/11-18-198 2-01-Oeht-considerat apcoordination-for-eht . pptx> (Jan. 2019) pp. 1-10.

Park, E. et al., "Overview of PHY Features for EHT" IEEE 802.11-18/1967r1, IEEE, doc: IEEE 802.11-18/1967rl, (Jan. 2019) pp. 1-22.

Notice of Reasons for Refusal issued by the Japanese Patent Office on Jan. 6, 2023 in corresponding JP Patent Application No. 2019-036401, with English translation.

Stacey, R. et al., "Proposed TGax draft specification" IEEE P802.11 Wireless LANs (Mar. 2016) XP055493780, pp. 1-160, Retrieved from the Internet: URL:https://mentor.ieee.org/802.11/dcn/16/11-16-0024-01-00ax-proposed-draft-specification.docx.

Yang, B. et al., "Considerations on AP Coordination" IEEE doc.:802.11-18-1576-01-0eht (Sep. 2018) XP068128896, pp. 1-15, vol. 802.11 EHT, No. 1, Retrieved from the Internet: URL: https: //mentor.ieee.org/802.11/dcn/18/11-18-1576-01-0eht-considerations-on-ap-coordination.pptx.

Extended European Search Report issued in corresponding EP Patent Application No. 20763269.6, dated Dec. 5, 2022, pp. 1-10.

* cited by examiner

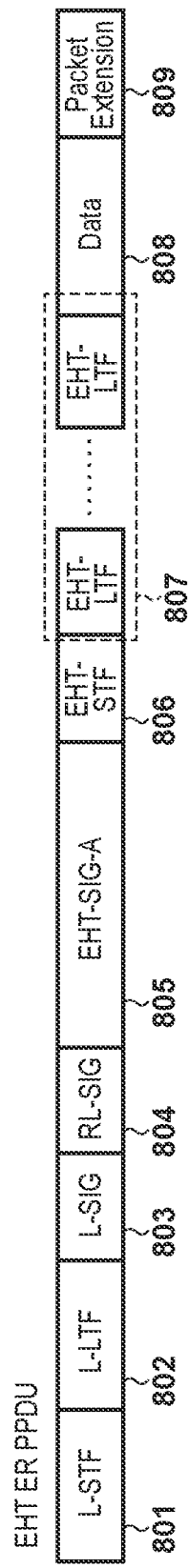

COMMUNICATION DEVICE, COMMUNICATION METHOD, AND STORAGE MEDIUM

CROSS-REFERENCE TO RELATED APPLICATIONS

This application is a Continuation of International Patent Application No. PCT/JP2020/004256, filed Feb. 5, 2020, which claims the benefit of Japanese Patent Application No. 2019-036401 filed Feb. 28, 2019, both of which are hereby incorporated by reference herein in their entirety.

BACKGROUND OF THE INVENTION

Field of the Invention

The present invention relates to a communication control technique in a wireless LAN.

Background Art

The Internet usage has recently increased year by year along with the development of information communication technologies, and various communication techniques have been developed to cope with an increase in demand. In particular, wireless local area network (wireless LAN) techniques implement throughput improvement in Internet communications for packet data, audio, video, and the like by wireless LAN terminals, and various technological developments have still been conducted actively.

In the development of wireless LAN techniques, a lot of standardization works by the IEEE (Institute of Electrical and Electronics Engineers) 802, which is a standardization organization for wireless LAN techniques, play an important role. As one of the wireless LAN communication standards, the IEEE802.11 standards are known, including standards such as IEEE802.11n/a/b/g/ac and IEEE802.11ax. For example, IEEE802.11ax implements a high peak throughput of up to 9.6 gigabits per second (Gbps) and additionally improves the communication speed under a congestion situation using OFDMA (Orthogonal frequency-division multiple access) (PTL 1).

Recently, in order to further improve throughput, a study group called IEEE802.11EHT (Extremely High Throughput) has been formed as a successor standard of IEEE802.11ax. To implement throughput improvement that is a target for the IEEE802.11EHT, D-MIMO (Distributed MIMO) configured to increase the number of antennas by causing a plurality of spatially distributed access points to cooperatively operate has been examined. Note that MIMO is an abbreviation of Multi-Input Multi-Output. Conventionally, during communication between one access point and an STA (station) that is a wireless LAN terminal, even if a plurality of access points can be connected to the STA, the access points other than the access point already connected to the STA do not communicate with the STA to avoid communication collision. The D-MIMO is a technique of allowing a plurality of access points to communicate with an STA via the same channel at the same time using a plurality of spatial streams formed by a plurality of antennas, and can implement throughput improvement by improving space use efficiency.

CITATION LIST

Patent Literature

PTL 1: Japanese Patent Laid-Open No. 2018-50133

When a STA communicates with a plurality of access points adaptable to D-MIMO, the STA preferably has information about spatial streams formed by the all access points when performing communication processing. However, in the conventional standards, setting the number of spatial streams formed by a plurality of access points in a frame to be transmitted to an STA has not been defined.

SUMMARY OF THE INVENTION

The present disclosure provides a technique for causing a wireless LAN terminal to obtain information about the number of spatial streams formed by a plurality of access points.

A communication device according to one aspect of the present invention has the following characteristic features. That is, there is provided a communication device that transmits a physical (PHY) frame including a preamble and a data field, wherein the preamble includes: a Legacy Short Training Field (L-STF); a Legacy Long Training Field (L-LTF) arranged immediately after the L-STF in the frame; a Legacy Signal Field (L-SIG) arranged immediately after the L-LTF in the frame, an EHT (Extremely High Throughput) Signal Field (EHT-SIG-A) arranged after the L-SIG in the frame; an EHT Short Training Field (EHT-STF) arranged immediately after the EHT-SIG-A in the frame; and an EHT Long Training Field (EHT-LTF) arranged immediately after the EHT-STF in the frame, and the EHT-SIG-A includes a subfield indicating the number of spatial streams which are formed by the communication device and not less than one communication device different from the communication device and used to transmit the frame.

Further features of the present invention will become apparent from the following description of exemplary embodiments with reference to the attached drawings.

BRIEF DESCRIPTION OF THE DRAWINGS

FIG. 8 is a view showing an example of the PHY frame structure of an EHT MU PPDU.

DESCRIPTION OF THE EMBODIMENTS

Figure 1:
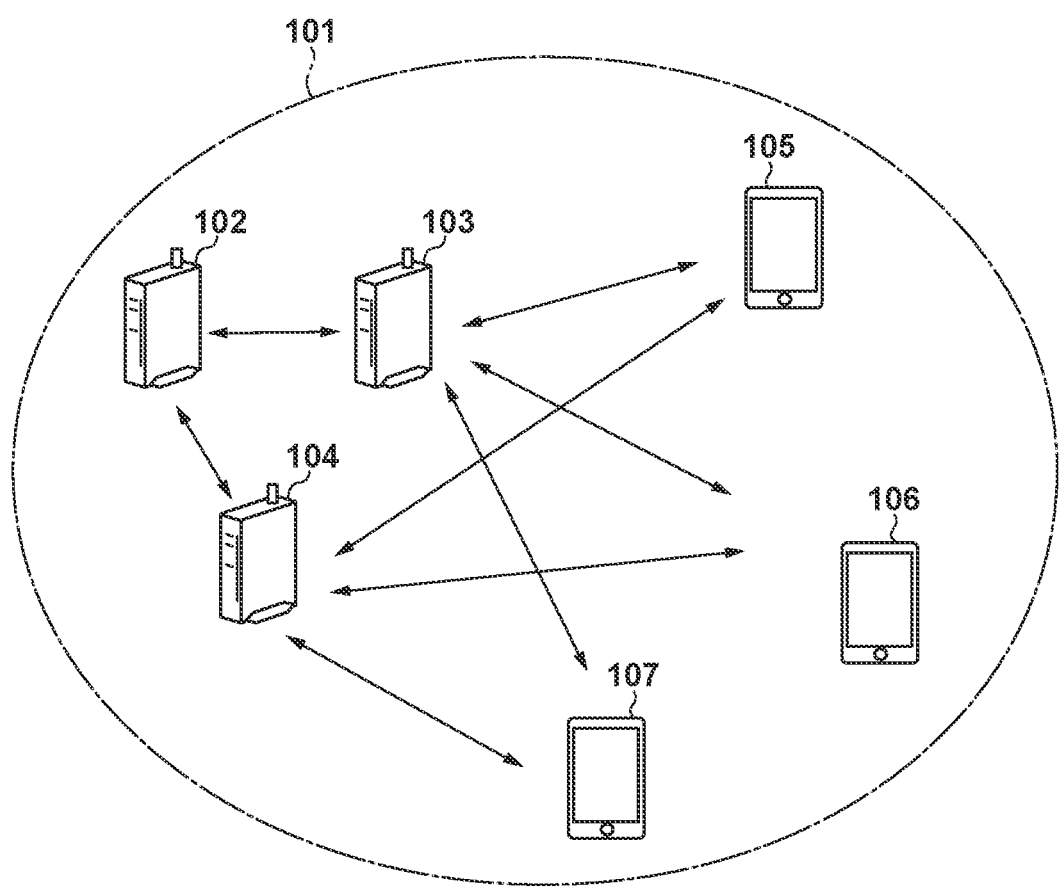
FIG. 1 is a view showing an example of the configuration of a network.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows an example of the configuration of a wireless communication network according to this embodiment. This wireless communication network is configured to include three access points (AP 102, AP 103, and AP 104) and three STAs (STA 105, STA 106, and STA 107) as devices (EHT devices) complying with the IEEE802.11EHT (Extremely High Throughput) standard. Note that it may be understood that EHT is an acronym of Extreme High Throughput. As shown in FIG. 1, a network cooperatively formed by the AP 102, the AP 103, and the AP 104 is indicated by a circle 101. In this embodiment, the AP 103 and the AP 104 can transmit/receive signals transmitted/received by the AP 102. Note that the AP 102 and the AP 103 or the AP 102 and the AP 104 may be connected by a wire or wirelessly. Also, the AP 103 and the AP 104 may be able or unable to transmit/receive signals to/from each other. In this embodiment, the STA 105 can transmit/receive frames from the AP 103 and the AP 104. The AP 103 and the AP 104, which directly transmit/receive signals to/from each STA, will be referred to as slave access points (S-APs) here. Also, the AP 102 that can transmit/receive frames to/from each STA by issuing instructions to the AP 103 and the AP 104 will be referred to as a master access point (to be referred to as an M-AP hereinafter). Note that the AP 102 that is an M-AP may directly transmit/receive signals to/from the STA 105. In this case, the AP 102 can operate as an M-AP and an S-AP.

The APs 102 to 104 are adaptable to D-MIMO (Distributed MIMO) that is one of methods for forming a Multi-AP Coordination system in the IEEE802.11EHT standard. In this embodiment, the AP 103 and the AP 104 hold two antennas and four antennas, respectively. Hence, the maximum number of spatial streams (to be referred to as the number of streams hereinafter) to which the AP 103 is adaptable is 2, and the maximum number of streams to which the AP 104 is adaptable is 4. In addition, the maximum number of streams to which the AP 102 is adaptable is 1, and the maximum number of streams to which the STA 105 is adaptable is 8. Note that the numbers are merely examples for the description, and other numbers of antennas (numbers of streams) may be used.

Note that every AP can play the role of an M-AP if the APs are located in the same wireless communication network. That is, in FIG. 1, the AP 103 or the AP 104 can also be an M-AP. The M-AP may have a role of, for example, sending an instruction to each AP without performing beacon transmission.

Note that the configuration of the wireless communication network shown in FIG. 1 is merely an example for the description and, for example, a network including many EHT devices and legacy devices (communication devices complying with the IEEE802.11a/b/g/n/ax standards) in a wider area may be formed. Also, the arrangement of the communication devices is not limited to that shown in FIG. 1, and the following argument is applicable to various positional relationships of the communication devices as well.

(Configuration of AP)

Figure 2:
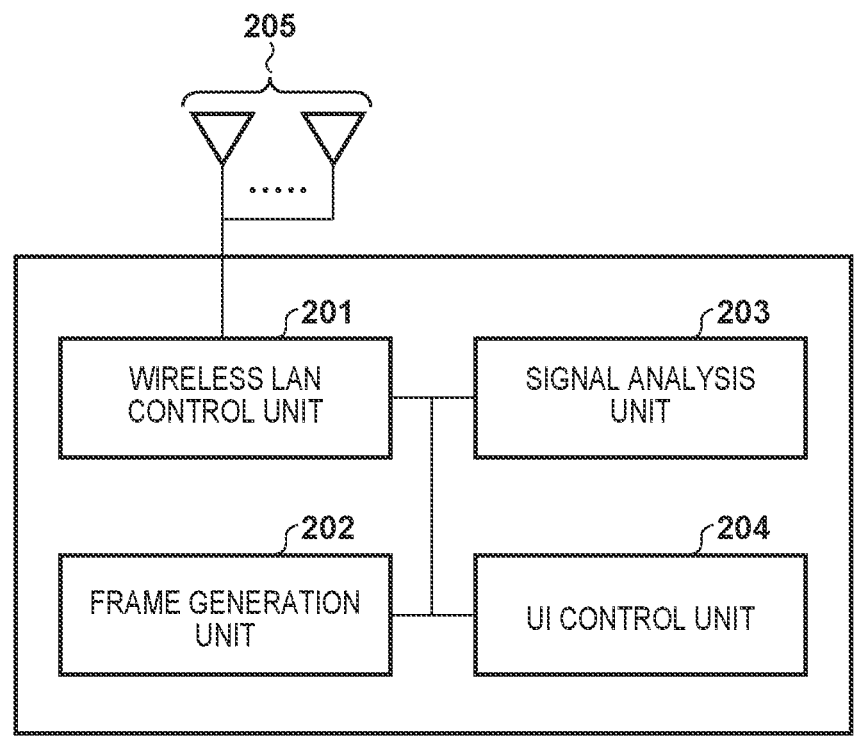
FIG. 2 is a block diagram showing an example of the functional configuration of an AP.

FIG. 2 is a block diagram showing the functional configuration of the AP 103. Note that the AP 104 has the same functional configuration as the AP 103. The AP 103 includes, as an example of its functional configuration, a wireless LAN control unit 201, a frame generation unit 202, a signal analysis unit 203, and a UI (User Interface) control unit 204.

The wireless LAN control unit 201 can be configured to include one or more antennas 205 and circuits configured to transmit/receive a radio signal (radio frame) to/from another wireless LAN device, and a program configured to control these. The wireless LAN control unit 201 executes communication control of the wireless LAN based on a frame generated by the frame generation unit 202 in accordance with the standard of the IEEE802.11 series.

The frame generation unit 202 generates a frame to be transmitted by the wireless LAN control unit 201 based on the result of analysis performed by the signal analysis unit 203 for a signal received by the wireless LAN control unit 201. The frame generation unit 202 may create a frame without depending on the analysis result of the signal analysis unit 203. The signal analysis unit 203 analyzes a signal received by the wireless LAN control unit 201. For example, if the AP 103 performs a D-MIMO operation, and operates as an S-AP, the signal analysis unit 203 analyzes the contents of a received frame. At this time, concerning a frame that the AP 103 transmits to the STA 105, the signal analysis unit 203 can obtain, by the analysis, information representing how many APs that transmit frames to the STA 105 exist in addition to the AP 103, and how many antennas exist. The UI control unit 204 accepts an operation by the user (not shown) of the AP 103 on an input unit 304 (FIG. 3), and performs control of transmitting a control signal corresponding to the operation to each constituent element or controls output (including display and the like) for an output unit 305 (FIG. 3).

Figure 3:
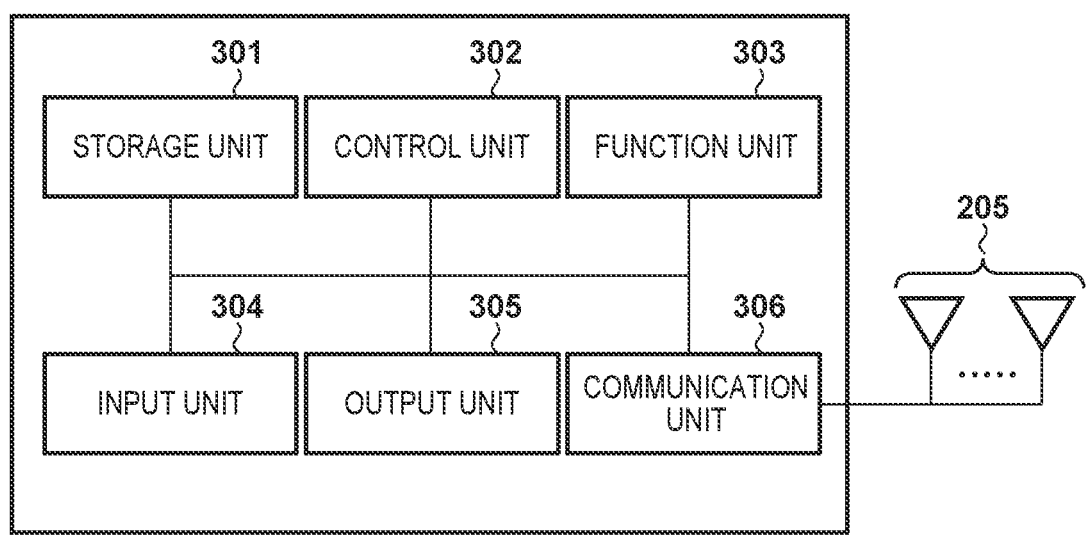
FIG. 3 is a block diagram showing an example of the hardware configuration of the AP.

FIG. 3 shows the hardware configuration of the AP 103 according to this embodiment. Note that the AP 104 has the same hardware configuration as the AP 103. The AP 103 includes, as an example of its hardware configuration, a storage unit 301, a control unit 302, a function unit 303, the input unit 304, the output unit 305, a communication unit 306, and the one or more antennas 205.

The storage unit 301 is formed by both of a ROM and a RAM or one of them, and stores programs for performing various kinds of operations to be described later and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used as the storage unit 301.

The control unit 302 is formed by, for example, a processor such as a CPU or an MPU, an ASIC (Application Specific Integrated Circuit), a DSP (Digital Signal Processor), an FPGA (Field Programmable Gate Array), or the like. Here, CPU is an acronym of Central Processing Unit, and MPU is an acronym of Micro Processing Unit. The control unit 302 executes the programs stored in the storage unit 301, thereby controlling the entire AP 103. Note that the control unit 302 may control the entire AP 103 by cooperation of the programs stored in the storage unit 301 and an OS (Operating System).

In addition, the control unit 302 controls the function unit 303 to execute predetermined processing such as image capturing, printing, or projection. The function unit 303 is hardware used by the AP 103 to execute predetermined processing. For example, if the AP 103 is a camera, the function unit 303 is an image capturing unit and performs image capturing processing. For example, if the AP 103 is a printer, the function unit 303 is a printing unit and performs print processing. For example, if the AP 103 is a projector, the function unit 303 is a projection unit and performs projection processing. Data to be processed by the function unit 303 may be data stored in the storage unit 301, or may be data communicated with an STA or another AP via the communication unit 306 to be described later.

The input unit 304 accepts various kinds of operations from a user. The output unit 305 performs various kinds of outputs for the user. Here, the output by the output unit 305 includes at least one of display on a screen, audio output by a loudspeaker, vibration output, and the like. Note that both the input unit 304 and the output unit 305 may be implemented by one module, like a touch panel.

The communication unit 306 controls wireless communication complying with the IEEE802.11EHT series standard, or IP (Internet Protocol) communication. Also, the communication unit 306 controls the one or more antennas 205 to transmit/receive radio signals for wireless communication. The AP 103 communicates contents such as image data, document data, and video data with another communication device via the communication unit 306. Note that in this embodiment, the AP 103 and the AP 104 hold two antennas and four antennas, respectively, as described above.

(Configuration of STA)

The functional configuration and the hardware configuration of the STA 105 are the same as the functional configuration (FIG. 2) and the hardware configuration (FIG. 3) of the AP 103 described above, respectively. That is, the STA 105 can be configured to include, as its functional configuration, the wireless LAN control unit 201, the frame generation unit 202, the signal analysis unit 203, and the UI control unit 204 and include, as its hardware configuration, the storage unit 301, the control unit 302, the function unit 303, the input unit 304, the output unit 305, the communication unit 306, and the antennas 205.

(Procedure of Processing)

Figure 4:
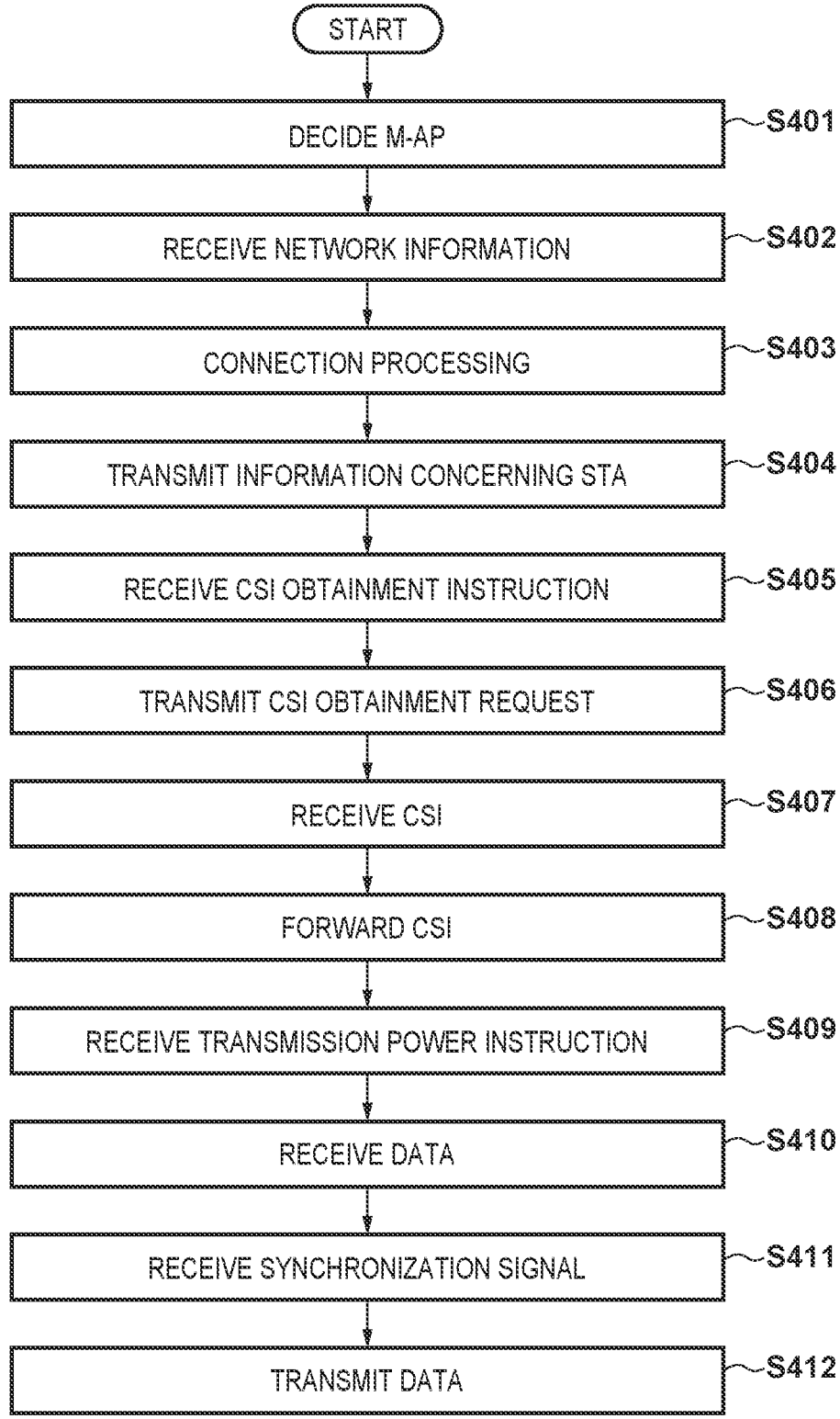
FIG. 4 is a flowchart showing processing executed by the AP.
Figure 5:
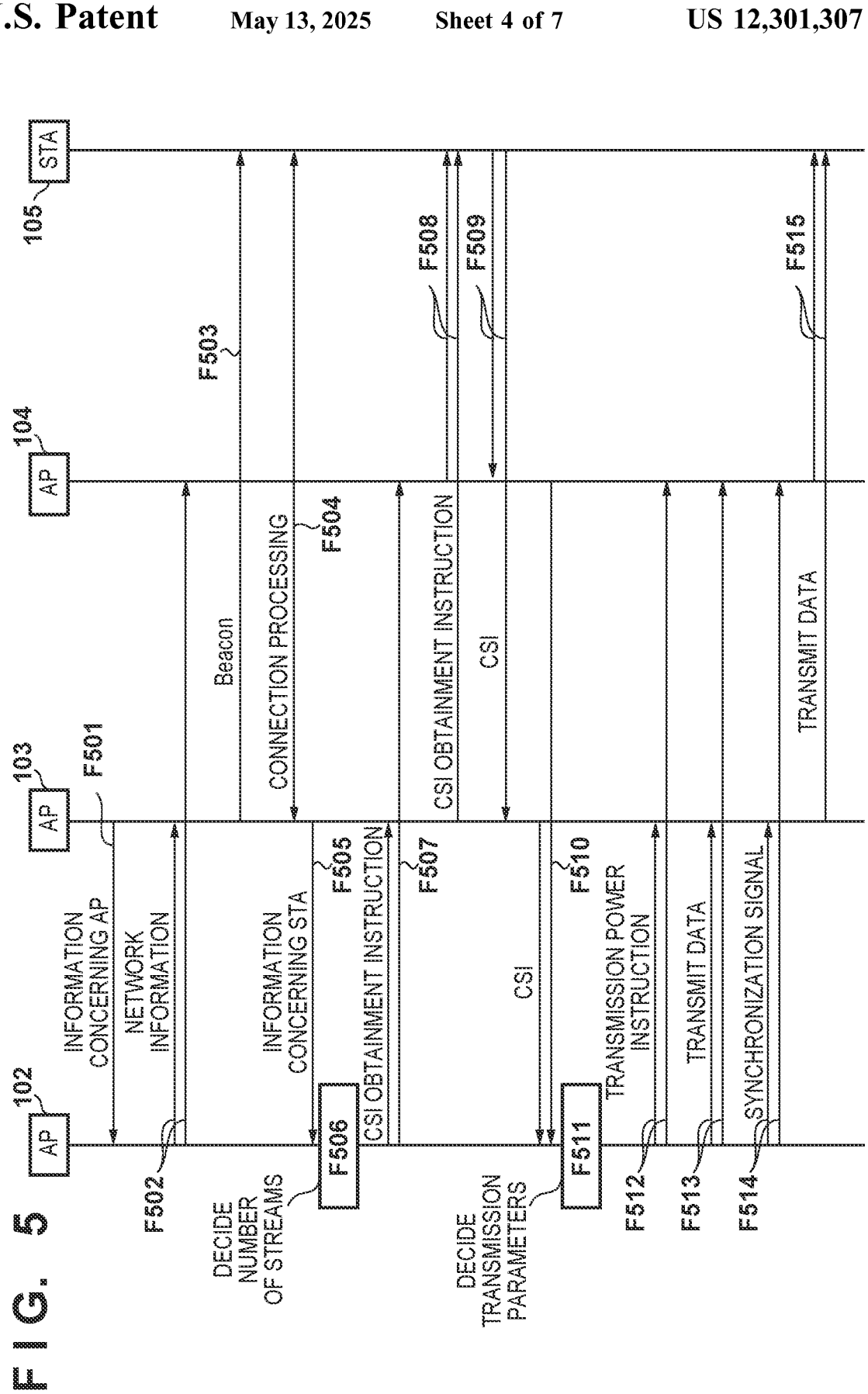
FIG. 5 is a sequence chart showing processing executed in a wireless communication network.

Next, the procedure of processing executed by the AP 103 configured as described above and the sequence of processing executed by the wireless communication system shown in FIG. 1 will be described with reference to FIGS. 4 and 5. FIG. 4 shows a flowchart of processing after information exchange is done between the APs until data is transmitted from the AP 103 (S-AP) to the STA 105. The flowchart shown in FIG. 4 can be implemented when the control unit 302 of the AP 103 executes a control program stored in the storage unit 301 and executes calculation and processing of information and control of each hardware. FIG. 5 shows a sequence chart of processing executed by the wireless communication system.

First, the AP 103 decides which communication device should play the role of an M-AP among the APs 102 to 104 (step S401, F501). The decision processing can be decided when the AP 103 transmits information (including various kinds of parameters concerning the AP) concerning the AP 103 to the AP 102. In this example, the AP 102 is decided to play the role of an M-AP. That is, each of the AP 103 and the AP 104 plays the role of an S-AP. In the processing up to here, the AP 102 can ascertain, based on the information obtained from the AP 103 and the AP 104, the number of spatial streams (the number of antennas) to which each of the AP 103 and the AP 104 is adaptable. Next, upon receiving network information such as an SSID and a BSSID from the AP 102 (M-AP) (step S402, F502), the AP 103 transmits a beacon to the STA 105 in accordance with the received information (F503). After that, based on the transmitted beacon, the AP 103 performs connection processing complying with the IEEE802.11 series standards with the STA 105 (step S403, F504). The AP 103 may forward frames such as Probe Request, Association Request, and Auth (authentication) received during the connection processing directly to the AP 102. In addition, the AP 103 may transmit frames such as Probe Request, Association Request, and Auth received from the AP 102 during the connection processing directly to the STA 105. The AP 104 performs connection processing with the STA 105, like the AP 103.

When the connection processing is completed, the AP 103 transmits information (various kinds of parameters concerning the STA) concerning the STA 105 to the AP 102 (step S404, F505). The information concerning the STA 105 can include the maximum number of streams to which the STA 105 is adaptable. Since the maximum number of streams to which the STA 105 is adaptable is 8, as described in the description of FIG. 1, the number (a value representing 8) can be included in the information concerning the STA 105, which is transmitted from the AP 103 to the AP 102. Upon receiving the information concerning the STA 105 from the AP 103, the AP 102 decides the number of streams for the STA 105 based on the information (F506).

Next, the AP 103 receives a signal (CSI obtainment instruction) for instructing obtainment of a CSI (Channel State Indication) from the AP 102 (step S405, F507). The CSI obtainment instruction is also received by the AP 104 (F507). After that, in accordance with a synchronization signal (not shown) called a trigger frame received from the AP 102, the AP 103 transmits a signal (CSI obtainment request) for requesting the STA 105 to obtain the CSI (step S406, F508). Similarly, the AP 104 transmits the CSI obtainment request to the STA 105 (F508). Note that the CSI obtainment instruction transmitted by the AP 102 may have the role of the synchronization signal. Next, the AP 103 receives the CSI from the connected STA 105 (step S407, F509), and forwards the received CSI to the AP 102 (step S408, F510). Similarly, the AP 104 receives the CSI from the connected STA 105, and forwards it to the AP 102 (F509 and F510). Based on the CSI received from each of the AP 103 and the AP 104, the AP 102 decides transmission parameters including a transmission power and a transmission timing when transmitting data to the STA 105 (F511). The transmission power can be decided for each antenna of the S-APs. The AP 102 also decides streams (spatial streams cooperatively formed by the AP 103 and the AP 104) to be used when transmitting data to the STA 105 and the number of streams (number of use streams). Note that a radio wave from the AP 103 or the AP 104 may fail in reaching the STA 105 depending on the situation. In this case, the total number of streams when communicating with the STA 105 may be smaller than the number (=8) decided in step S501. In this embodiment, only the AP 103 and the AP 104 can communicate with the STA 105, and the AP 102 decides the number of use streams to 6. This is because the sum of the maximum number of streams (=2) of the AP 103 and the maximum number of streams (=4) of the AP 104 is 6 (=2+4), which is smaller than the maximum number of streams (=8) of the STA 105. Note that if the sum of the maximum numbers of streams of the AP 103 and the AP 104 is larger than the maximum number of streams of the STA 105, the AP 102 may decide the use streams and the number of use streams based on the received CSI and the like.

Next, the AP 102 decides the power of each antenna of the AP 103 and the AP 104 at the time of transmission in accordance with the decided use streams, and transmits transmission parameters including information representing the transmission power of each antenna and information representing the decided number of use streams to the AP 103 and the AP 104, and the AP 103 and the AP 104 receive the transmission parameters (step S409, F512). Next, the AP 102 transmits data to be transmitted to the STA 105 to the AP 103 and the AP 104, and the AP 103 and the AP 104 receive the data (step S410, F513). Upon receiving the transmission parameters (step S409, F512) and the data (step S410, F513), each of the AP 103 and the AP 104 generates a radio frame including the data and the information of the number of use streams, which is included in the transmission parameters, adjusts the transmission timing in accordance with the reception of the synchronization signal (step S411, F514), and transmits the data in the form of the radio frame to the STA 105 (step S412, F515). The data is transmitted by power set based on the information representing the transmission power, which is included in the transmission parameters. Note that the AP 103 may receive the transmission parameters (step S409), the data (step S410), and the synchronization signal (step S411) simultaneously or at different timings. This also applies to the AP 104. Note that in this embodiment, the AP 102 (M-AP) decides the transmission power of each of the AP 103 and the AP 104. Here, the AP 103 or the AP 104 may decide the transmission power by itself. However, if the AP 103 and the AP 104 have different gains, processing in the STA 105 may be complex.

(Frame Structure)

Figure 6:
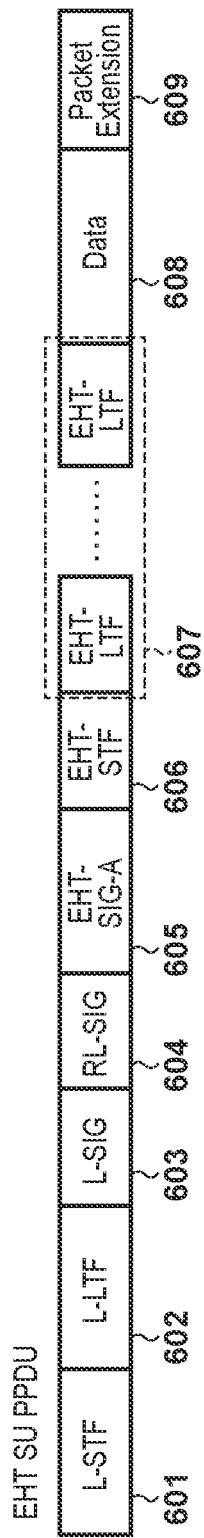
FIG. 6 is a view showing an example of the PHY frame structure of an EHT SU PPDU.
Figure 7:
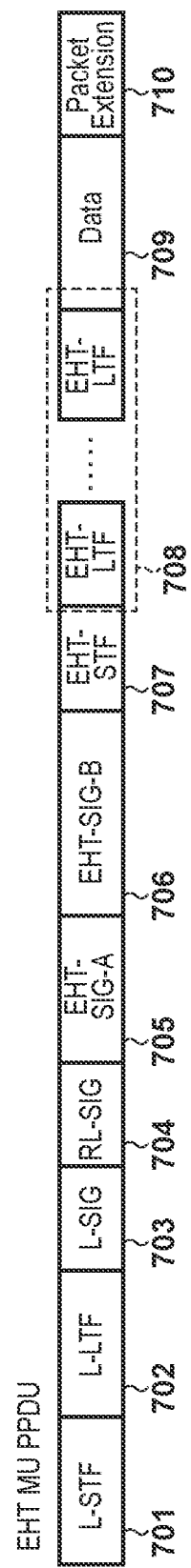
FIG. 7 is a view showing an example of the PHY frame structure of an EHT ER PPDU.

FIGS. 6 to 8 show examples of PHY (physical) frame structures of PPDUs defined by the IEEE802.11EHT standard and transmitted in step S412 or F515. Note that PPDU is an abbreviation of Physical Layer (PHY) Protocol Data Unit. FIG. 6 shows an example of the PHY frame structure of an EHT SU PPDU that is a PPDU for single-user (SU) communication (between an AP and a single STA). FIG. 7 shows an example of the PHY frame structure of an EHT MU PPDU that is a PPDU for multi-user (MU) communication (between an AP and a plurality of STAs). FIG. 8 shows an example of the PHY frame structure of an EHT ER PPDU that is a PPDU for communication in an extended area (communication distance) (Extended Range). The EHT ER PPDU is used in communication between an AP and a single STA.

Pieces of information commonly included in the PPDUs shown FIGS. 6 to 8 are an STF (Short Training Field), an LTF (Long Training Field), and an SIG (Signal Field). Taking FIG. 6 as an example, the PPDU head portion includes an L (Legacy)-STF 601, an L-LTF 602, and an L-SIG 603 having backward compatibility with the IEEE802.11a/b/g/n/ax standards. The L-STF 601 is used for detection of a PHY frame signal, automatic gain control (AGC), timing detection, or the like. The L-LTF 602 arranged immediately after the L-STF 601 is used for highly accurate frequency/time synchronization, obtainment of propagation channel information (CSI), or the like. The L-SIG 603 arranged immediately after the L-LTF 602 is used for transmitting control information including information such as a data transmission rate and a PHY frame length. A legacy device complying with the IEEE802.11a/b/g/n/ax standards can decode data of the above-described various kinds of legacy fields (the L-STF 601, the L-LTF 502, and the L-SIG 603). The various kinds of legacy fields are similarly included in the PPDUs shown in FIGS. 7 and 8 as well.

Next to the L-STF 601, the L-LTF 602, and the L-SIG 603 described above, the EHT SU PPDU shown in FIG. 6 includes an RL-SIG 604, an EHT-SIG-A 605, an EHT-STF 606, an EHT-LTF 607, a data field 608, and a Packet extension 609. The RL-SIG 604 may be absent. The EHT-SIG-A 605 is arranged after the L-SIG 603, the EHT-STF 606 is arranged immediately after the EHT-SIG-A 605, and the EHT-LTF 607 is arranged immediately after the EHT-STF 606. Note that the field including the L-STF 601, the L-LTF 602, the L-SIG 603, the RL-SIG 604, the EHT-SIG-A 605, the EHT-STF 606, and the EHT-LTF 607 is called a preamble. The EHT-SIG-A 605 includes Information such as EHT-SIG-A1 and EHT-SIG-A2 necessary for reception of the PPDU. Subfields that form the EHT-SIG-A1 and the EHT-SIG-A2 included in the EHT-SIG-A 605 and a description thereof are shown in Table 1 and Table 2.

TABLE 1

|  | Bit Position | Subfield | Bit Count | Description |
|---|---|---|---|---|
| EHT-SIG-A1 | B0 | Format | 1 | "1" is set for an EHT PPDU and an EHT ER PPDU to distinguish them from an EHT TB PPDU. |
|  | B1 | Beam Change | 1 | "1" is set if the pre-EHT of the PPDU is arranged in a space different from the first symbol of the EHT-LTF, or "0" is set if the pre-EHT is mapped similarly to the first symbol. |
|  | B2 | UL/DL | 1 | This subfield indicates whether the PPDU is for UL or DL, and has the same value as TXVECTOR UPLINK_FLAG. |
|  | B3-B6 | MCS | 4 | This subfield indicates the value of the Modulation and Coding Scheme. In a case of an EHT SU PPDU, n = 0, 1, 2, . . . , 11 (12 to 15 are reserved). In a case of an EHT ER SU PPDU and Bandwidth = 0, n = 0, 1, 2 (3 to 15 are reserved areas). In a case of an EHT ER SU PPDU and Bandwidth = 1, n = 0 for MCS 0 (1 to 15 are reserved areas). |
|  | B7 | DCM | 1 | This subfield indicates whether Dual Carrier Modulation is applied to the data field. If "0" is set in the STBC field, "1" is set. (If both the DCM and STBC fields are "1", neither of them is applied) If DCM is not applied, "0" is set. |
|  | B8-B13 | BSS Color | 6 | 6-bit number for identifying the BSS |
|  | B14 | Reserved | 1 | Reserved field |
|  | B15-B18 | Spatial Reuse | 4 | This subfield indicates whether Spatial Reuse is allowed during transmission of this PPDU. The value of Spatial Reuse field encoding shown in the separate table is set. |

TABLE 1-continued

| Bit Position | Subfield | Bit Count | Description |
|---|---|---|---|
| B19-B20 | Bandwidth | 2 | In a case of an EHT SU PPDU: "0" is set for 20 MHz, "1" is set for 40 MHz, "2" is set for 80 MHz, or "3" is set for 160 MHz (80 + 80 MHz). In a case of an EHT ER SU PPDU: "0" is set for 242-tone RU, or "1" is set for upper 106-tone RU of 20 MHz. |
| B21-B22 | GI + LTF Size | 2 | This subfield indicates the Guard Interval period and the EHT-LTF size. "0" is set for 1 × EHT-LTF and 0.8 µs GI, "1" is set for 2 × EHT-LTF and 0.8 µs GI, "2" is set for 2 × EHT-LTF and 1.6 µs GI, "3" is set if both the DCM and STBC fields are "1" and for 4 × EHT-LTF and 0.8 µs GI, or "3" is set for 4 × EHT-LTF other than the above case and 3.2 µs GI. |
| B23-B25 | NSTS And Midamble Periodicity | 2 | This subfield indicates the number of space-time streams and the midamble period for frame synchronization. If the Doppler field is "0", "(the number of space-time streams) − 1" is set. If the Doppler field is "1", B23 and B24 indicate the number of space-time streams. B25 is "0" if the midamble period is 10, or "1" if the midamble period is 20. |

TABLE 2

| Bit Position | Subfield | Bit Count | Description |
|---|---|---|---|
| EHT-SIG-A2 B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION-512)/8 is set in B1 to B6. |
| B7 | Coding | 1 | "0" is set for BCC (Binary Convolutional Code), or "1" is set for LDPC (Low Density Parity Check). |
| B8 | LDPC Extra Symbol Segment | 1 | This subfield indicates the presence/absence of an extra OFDM symbol segment for LDPC. |
| B9 | STBC | 1 | "1" is set in this field if STBC (Space-Time Block Coding) is used and the DCM subfield is "0", "1" is also set if neither DCM nor STBC is applied, or "0" is set otherwise. |
| B10 | Beam-formed | 1 | "1" is set if beamforming steering is applied to the waveform of SU transmission. |
| B11-B12 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| B13 | PE Disambiguity | 1 | Disambiguity field of Packet Extension |
| B14 | Reserved | 1 | Reserved field |
| B15 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |
| B16-B19 | CRC | 4 | The CRC of the EHT-SIG-A (26 bits of A1 and 16 bits up to B15 of A2, that is, 42 bits in total) field up to here. |
| B20-B75 | Tail | 6 | An area to set "0" to indicate the end portion to a trellis convolution decoder. |

The number of streams of MIMO communication is indicated by an NSTS And Midamble Periodicity subfield of EHT-SIG-A1, and the possible value changes depending on the value of the Doppler field of EHT-SIG-A2. If the value of the Doppler field is 0, it indicates that the moving speed is low, and the value of the number of streams can be set to 1 to 16. If the value of the Doppler field is 1, it indicates that the moving speed is high, and the value n of the number of streams is limited to 1 to 4. Note that in this embodiment, 4 bits are allocated to the NSTS And Midamble Periodicity field. As an extension assuming the standard of the EHT standard, more than 4 bits, for example, 5 bits may be allocated to indicate the number of streams larger than 16.

In this embodiment, as the number of streams shown in the NSTS And Midamble Periodicity subfield, the total number of streams (the number of use streams) formed for the STA (STA 105) by the APs (the AP 103 and the AP 104) adaptable to D-MIMO is set. That is, not the number of use streams when the AP 103 or the AP 104 communicates with the STA 105 by itself but the sum of the numbers of streams is set. In this embodiment, the number of use streams for communication with the STA 105 is decided as 6 from the maximum number of streams (=2) of the AP 103 and the maximum number of streams (=4) of the AP 104. Hence, although the maximum number of streams to which the AP 103 is adaptable is 2, the value input here is 6. The set number of use streams is set based on the number of use streams, which is instructed by the M-AP (AP 102) in step S409 or F512.

The EHT-STF 606 next to the EHT-SIG-A 605 is an abbreviation of EHT Short Training Field, and its main object is to improve automatic gain control in MIMO transmission. The EHT-LTF 607 is an abbreviation of EHT Long Training Field and provides a means for estimating a MIMO channel to a receiver. Note that in the description of FIG. 6, the number of use streams is set based on the value (information) received from the M-AP. However, not only the number of use streams but all values may be input based on the value received from the M-AP.

The EHT ER PPDU shown in FIG. 8 is a PPDU used to extend the communication distance, as described above, and is used in communication between an AP and a single STA. The EHT ER PPDU includes an L-STF 801, an L-LTF 802, an L-SIG 803, an RL-SIG 804, an EHT-SIG-A 805, an EHT-STF 806, an EHT-LTF 807, a data field 808, and a Packet extension 809. The RL-SIG 804 may be absent. The L-LTF 802 is arranged immediately after the L-STF 801, the L-SIG 803 is arranged immediately after the L-LTF 802, the EHT-SIG-A 805 is arranged after the L-SIG 803, the EHT-STF 806 is arranged immediately after the EHT-SIG-A 805, and the EHT-LTF 807 is arranged immediately after the EHT-STF 806. Note that the field including the L-STF 801, the L-LTF 802, the L-SIG 803, the RL-SIG 804, the EHT-SIG-A 805, the EHT-STF 806, and the EHT-LTF 807 is called a preamble. Information included in each field has the same contents as in the EHT SU PPDU shown in FIG. 6, and a description thereof will be omitted.

The EHT MU PPDU shown in FIG. 7 is a PPDU used in communication of MU, as described above. The EHT MU PPDU includes an L-STF 701, an L-LTF 702, an L-SIG 703, an RL-SIG 704, an EHT-SIG-A 705, an EHT-SIG-B 706, an EHT-STF 707, an EHT-LTF 708, a data field 709, and a Packet extension 710. The RL-SIG 704 may be absent. The L-LTF 702 is arranged immediately after the L-STF 701, the L-SIG 703 is arranged immediately after the L-LTF 702, the EHT-SIG-A 705 is arranged after the L-SIG 703, the EHT-SIG-B 706 is arranged immediately after the EHT-SIG-A 705, the EHT-STF 707 is arranged immediately after the EHT-SIG-B 706, and the EHT-LTF 708 is arranged immediately after the EHT-STF 707. Note that the field including the L-STF 701, the L-LTF 702, the L-SIG 703, the RL-SIG 704, the EHT-SIG-A 705, the EHT-SIG-B 706, the EHT-STF 707, and the EHT-LTF 708 is called a preamble.

The EHT-SIG-A 705 includes Information such as EHT-SIG-A1 and EHT-SIG-A2 necessary for reception of the PPDU. Subfields that form the EHT-SIG-A1 and the EHT-SIG-A2 included in the EHT-SIG-A 705 and a description thereof are shown in Table 3 and Table 4.

TABLE 3

| | Bit Position | Subfield | Bit Count | Description |
|---|---|---|---|---|
| EHT-SIG A1 | B0 | UL/DL | 1 | This subfield indicates whether the PPDU is for UL or DL, and has the same value as TXVECTOR UPLINK_FLAG. |
| | B1-B3 | SIGB MCS | 3 | This subfield indicates the MCS of the EHT-SIG-B field. "0" is set for MCS 0, "1" is set for MCS 1, "2" is set for MCS 2, "3" is set for MCS 3, "4" is set for MCS 4, or "5" is set for MCS 5. "6" and "7" are reserved areas. |
| | B4 | SIGB DCM | 1 | "1" is set if the HT-SIG-B field is modulated using DCM. |
| | B5-B10 | BSS Color | 6 | 6-bit number for identifying the BSS |
| | B11-B14 | Spatial Reuse | 4 | This subfield indicates whether Spatial Reuse is allowed during transmission of this PPDU. The value of Spatial Reuse field encoding shown in the separate table is set. |
| | B15-B17 | Bandwidth | 3 | "0" is set for 20 MHz, "1" is set for 40 MHz, or "3" is set for 160 MHz (80 + 80 MHz). When the SIGB Compression field is "0", "4" is set if only the secondary 20 MHz is puncturing in 80 MHz preamble puncturing, "5" is set if two 20 MHz of the secondary 40 MHz are puncturing in 80 MHz preamble puncturing, "6" is set if only the secondary 20 MHz is puncturing in 160 (or 80 + 80) MHz preamble puncturing, or "7" is set if only the secondary 40 MHz is puncturing in 160 (or 80 + 80) MHz preamble puncturing. If the SIGB field is "1", the value between "4" to "7" means "reserved". |

TABLE 3-continued

| Bit Position | Sub-field | Bit Count | Description |
|---|---|---|---|
| B18-B21 | Number of EHT-SIG-B Symbols or MU-MIMO Users | 4 | When the SIGB Compression field is "0", this subfield indicates the number of OFDMA symbols in the EHT-SIG-B. If the number of OFDM symbols in the EHT-SIG-B is smaller than 16, the number obtained by subtracting 1 from the number of OFDM symbols in the EHT-SIG-B is set. If at least one receiving terminal has set the capability of supporting the number of EHT SIG-B OFDM symbols larger than 16 to "0", "15" is set to indicate that the number of OFDM symbols in the EHT-SIG-B is 16. If all the receiving terminals have set the capability of supporting the number of EHT SIG-B OFDM symbols larger than 16 to "0" and the data rate of the EHT-SIG-B is smaller than MCS 4 which does not use DCM, "15" is set to indicate that the number of OFDM symbols in the EHT-SIG-B is equal to or larger than 16. When the SIGB Compression field is "1", the value set here means the number obtained by subtracting 1 from the number of MU-MIMO users. |
| B22 | SIG Compression | 1 | "1" is set if a Common field exists in the EHT-SIG-B. |
| B23-B24 | GI + LTF Size | 2 | This subfield indicates the Guard Interval period and the EHT-LTF size. "0" is set for 4 × EHT-LTF and 0.8 µs GI, "1" is set for 2 × EHT-LTF and 0.8 µs GI, "2" is set for 2 × EHT-LTF and 1.6 µs GI, or "3" is for 4 × EHT-LTF and 3.2 µs GI. |
| B25 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |

TABLE 4

| Bit Position | Subfield | Bit Count | Description |
|---|---|---|---|
| EHT-SIG-A2 B0-B6 | TXOP | 1 | Transmission Opportunity If TXOP_DURATION of TXVECTOR is UN-SPECIFIED and there is no period information, 127 is set. If TXOP_DURATION of TXVECTOR is smaller than 512, a value smaller than 127 is set to set NAV. At this time, if B0 is "0". FLOOR of TXOP_DURATION/8 (round down) is set in B1 to B6. If B0 is "1", FLOOR of (TXOP_DURATION-512)/8 is set in B1 to B6. |
| B7 | Reserved | 1 | Reserved field |
| B8-B10 | Number of EHT-LTF Symbols And Midamble Periodicity | 3 | This subfield indicates the number of EHT-LTFs. "0" is set for one EHT-LTF, "1" is set for two EHT-LTFs, "2" is set for four EHT-LTFs, "3" is set for six EHT-LTFs, or "4" is set for eight EHT-LTFs. When the Doppler field is "1", B8 and B9 indicate the number of EHT-LTF symbols, and B10 indicates the midamble period. |

TABLE 4-continued

| Bit Position | Subfield | Bit Count | Description |
|---|---|---|---|
| B11 | LDPC Extra Symbol Segment | 1 | This subfield indicates the presence/absence of an extra OFDM symbol segment for LDPC. |
| B12 | STBC | 1 | When the number of users of each RU (Resource-Unit) is not larger than 1, "1" is set to indicate that STBC is used for encoding. |
| B13-B14 | Pre-FEC Padding Factor | 2 | "0" is set if the Pre-EEC Padding Factor is 4, "1" is set if the Pre-FEC Padding Factor is 1, "2" is set if the Pre-FEC Padding Factor is 2, or "3" is set if the Pre-FEC Padding Factor is 3. |
| B15 | PE Disambiguity | 1 | Disambiguity field of Packet Extension |
| B16-B19 | CRC | 4 | The CRC of the EHT-SIG-A (26 bits of A1 and 16 bits up to B15 of A2, that is, 42 bits in total) field up to here. |
| B20-B25 | Tail | 6 | An area to set "0" to indicate the end portion to a trellis convolution decoder. |

The EHT-SIG-B 706 includes information such as Common field and User Block field necessary for reception of the PPDU. Subfields that form the Common field and the User Block field included in the EHT-SIG-B 706 and a description thereof are shown in Table 5 and Table 6.

TABLE 5

| | Subfield | Bit Count | Description |
|---|---|---|---|
| Common field | RU Allocation | N × 8 | This subfield indicates RU allocation used in the data portion of a frequency axis When N = 1, EHT MU PPDUs of 20 MHz and 40 MHz are allocated. When N = 2, an EHT MU PPDU of 80 MHz is allocated. When N = 4, an EHT MU PPDU of 160 MHz or 80 + 80 MHz is allocated. |
| | Center 26-tone RU | 1 | This subfield is used only when the Bandwidth field of EHT-SIG-A field of an EHT MU PPDU is larger than 1 (if the frequency is equal to or higher than 80 MHz). This subfield indicates whether to use a 26-tone RU at the center. |
| | CRC | 4 | CRC calculation value |
| | Tail | 6 | Trailer bit, which is set to 0. |

TABLE 6

| | Subfield | Bit Count | Description |
|---|---|---|---|
| User Block field | User field | N × 21 | This subfield indicates information for each user. |
| | CRC | 4 | CRC calculation value |
| | Tail | 6 | Trailer bit, which is set to 0. |

The format of the User field changes depending on whether to do transmission to a plurality of users by OFDMA or MU-MIMO. Table 7 shows a description of the User field in a case of transmission by OFDMA, and Table 8 shows a description of the User field in a case of transmission by MU-MIMO.

TABLE 7

| Bit Position | Subfield | Bit Count | Description |
|---|---|---|---|
| User field B0-B10 | STA-ID | 11 | This subfield indicates the ID of an STA or an STA group that is the receiver of the RU of an HE MU PPDU |
| B11-B13 | NSTS | 3 | This subfield indicates the number of Space-time streams |
| B14 | Tx Beamforming | 1 | When transmission Beamforming is used, "1" is set. When transmission Beamforming is not used, "0" is set. |
| B15-B18 | MCS | 4 | This subfield indicates the value of Modulation and Coding Scheme |
| B19 | DCM | 1 | This subfield indicates whether Dual Carrier Modulation is applied to the data field. |
| B20 | Coding | 1 | When BCC (Binary Convolutional Code) is used, "0" is set. When LDPC (Low Density Parity Check) is used, "1" is set. |

TABLE 8

| Bit Position | Subfield | Bit Count | Description |
|---|---|---|---|
| User field B0-B10 | STA-ID | 11 | This subfield indicates the ID of an STA or an STA group that is the receiver of the RU of an HE MU PPDU |
| B11-B14 | Spatial Configuration | 4 | This subfield indicates the number of Spatial Streams of an STA in MU-MIMO Allocation |
| B15-B18 | MCS | 4 | This subfield indicates the value of Modulation and Coding Scheme |
| B19 | Reserved | 1 | Reserved field |
| B20 | Coding | 1 | When BCC (Binary Convolutional Code) is used, "0" is set. When LDPC (Low Density Parity Check) is used, "1" is set. |

The number of streams of MIMO communication is indicated by an NSTS subfield or a Spatial configuration subfield in the User field of the EHT-SIG-B. Note that in this embodiment, 4 bits are allocated to the NSTS And Midamble Periodicity field. As an extension assuming the standard of the EHT standard, more than 4 bits, for example, 5 bits may be allocated to indicate the number of streams larger than 16.

In this embodiment, as the number of streams shown in the NSTS subfield or the Spatial configuration subfield, the total number of streams (the number of use streams) formed for the STA (STA 105) by the APs (the AP 103 and the AP 104) adaptable to D-MIMO is set (since the streams are for MU communication, the communication destination can include an STA other than the STA 105). That is, not the number of use streams when the AP 103 or the AP 104 communicates with the STA 105 by itself but the sum of the numbers of streams is set. In this embodiment, the number of use streams for communication with the STA 105 is decided as 6 from the maximum number of streams (=2) of the AP 103 and the maximum number of streams (=4) of the AP 104. Hence, although the maximum number of streams to which the AP 103 is adaptable is 2, the value input here is 6. The set number of use streams is set based on the number of use streams, which is instructed by the M-AP (AP 102) in step S409 or F512. Note that information included in each of the other fields has the same contents as the EHT SU PPDU shown in FIG. 6, and a description thereof will be omitted.

When the STA is notified of the number of spatial streams (the number of use streams) formed by a plurality of S-APs using the frame structures of PPDUs used in the IEEE802.11EHT standard shown in the present invention in the above-described way, the following advantages can be obtained. That is, even if a plurality of APs exist in fact and transmit data to an STA, for the viewpoint of the STA, a PPDU can be interpreted as if data were received from a single AP.

In this embodiment, the numbers of use streams shown in PPDUs are collectively managed by the M-AP, and the sum value is transmitted to the STA. However, another method may be used. For example, the S-AP may transmit data including information representing how many other APs exist, together with the number of streams to be used by the S-AP itself. The following advantages are considered to be obtained by this. In a case in which the synchronization accuracy of the S-APs that transmit data to the STA is low, if the total number of APs is unknown, when the data is individually restored and received by the STA, it may be impossible to restore data well, or it may be interpreted that data is deficient. Even in this case, since the total number of APs that communicate with the STA is known, the STA can wait until all data are received, and restore the data or extract the data field after the data becomes analyzable.

Note that FIGS. 6 to 8 show frame structures having backward compatibility with the IEEE802.11a/b/g/n/ax standards. If backward compatibility need not be ensured, the fields of the L-STF and the L-LTG may be omitted. Instead, the EHT-STF and the EHT-LTF may be inserted.

According to the present invention, it is possible to cause a wireless LAN terminal to obtain information about the number of spatial streams formed by a plurality of access points.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device that operates as an access point device, the communication device comprising:
   at least one memory; and
   at least one circuit or at least one processor that executes instructions stored in the memory,
   wherein the at least one circuit, the at least one processor or the combination of the at least one circuit and the at least one processor causes the communication device to perform:
   transmitting a physical (PHY) frame including a preamble and a data field, wherein
   the preamble includes:
      a Legacy Short Training Field (L-STF);
      a Legacy Long Training Field (L-LTF) arranged immediately after the L-STF in the frame;
      a Legacy Signal Field (L-SIG) arranged immediately after the L-LTF in the frame;
      a second Signal Field related to a second communication standard specified at least after a legacy communication standard corresponding to the L-SIG arranged after the L-SIG in the frame;
      a second Short Training Field (second STF) related to the second communication standard arranged immediately after the second Signal Field in the frame; and
      a second Long Training Field (second LTF) related to the second communication standard arranged immediately after the second STF in the frame, and
   the second Signal Field includes a subfield indicating a total maximum number of spatial streams which are formed by a plurality of access point devices including the communication device and at least one other access point devices that cooperatively communicate with a single receiver device,
   wherein the total maximum number of spatial streams to be included in the subfield is determined based on a maximum number of the one or more spatial streams to which the communication device is adaptable and a maximum number of the one or more spatial streams to which the at least one other access point device is adaptable, and
   wherein a used final number of streams depends on the total maximum number of spatial streams which is a sum of a maximum number of spatial streams of the plurality of access point devices compared with the maximum number of spatial streams of the single receiver device.

2. The communication device according to claim 1, wherein the communication device functions as a slave access point adaptable to D-MIMO (Distributed MIMO), and the total maximum number of spatial streams is set based on an instruction by the other access point device that functions as a master access point adaptable to the D-MIMO.

3. The communication device according to claim 1, wherein not less than four bits are allocated to the subfield indicating the total maximum number of spatial streams.

4. The communication device according to claim 1, wherein a maximum number of one or more spatial streams to which the communication device is adaptable or a maximum number of one or more spatial streams to which the at least one other access point device is adaptable is communicated between the access point devices including the communication device and the at least one other access point.

5. A communication device that operates as an access point device, the communication device comprising:
    at least one memory; and
    at least one circuit or at least one processor that executes instructions stored in the memory,
    wherein the at least one circuit, the at least one processor or the combination of the at least one circuit and the at least one processor causes the communication device to perform:
    transmitting a physical (PHY) frame including a preamble and a data field, wherein
    the preamble includes:
        a Legacy Short Training Field (L-STF);
        a Legacy Long Training Field (L-LTF) arranged immediately after the L-STF in the frame;
        a Legacy Signal Field (L-SIG) arranged immediately after the L-LTF in the frame;
        a second Signal Field related to a second communication standard specified at least after a legacy communication standard corresponding to the L-SIG arranged after the L-SIG in the frame;
        a third Signal Field related to the second communication standard arranged immediately after the second Signal Field in the frame;
        a second Short Training Field (second STF) related to the second communication standard arranged immediately after the third Signal Field in the frame; and
        a second Long Training Field (second LTF) related to the second communication standard arranged immediately after the second STF in the frame, and
    the third Signal Field includes a subfield indicating a total maximum number of spatial streams which are formed by a plurality of access point devices including the communication device and at least one other access point device that cooperatively communicate with a single receiver device,
    wherein the total maximum number of spatial streams to be included in the subfield is determined based on a maximum number of one or more spatial streams to which the communication device is adaptable and a maximum number of one or more spatial streams to which the at least one other access point device is adaptable, and
    wherein a used final number of streams depends on the total maximum number of spatial streams which is a sum of a maximum number of spatial streams of the plurality of access point devices compared with the maximum number of spatial streams of the single receiver device.

6. The communication device according to claim 5, wherein the communication device functions as a slave access point adaptable to D-MIMO (Distributed MIMO), and the total maximum number of spatial streams is set based on an instruction by the other access point device that functions as a master access point adaptable to the D-MIMO.

7. The communication device according to claim 5, wherein not less than four bits are allocated to the subfield indicating the total maximum number of spatial streams.

8. The communication device according to claim 5, wherein a maximum number of one or more spatial streams to which the communication device is adaptable or a maximum number of one or more spatial streams to which the at least one other access point device is adaptable is communicated between the access point devices including the communication device and the at least one other access point.

9. A communication device that operates as a station device, the communication device comprising:
    at least one memory; and
    at least one circuit or at least one processor that executes instructions stored in the memory,
    wherein the at least one circuit, the at least one processor or the combination of the at least one circuit and the at least one processor causes the communication device to perform:
    receiving a physical (PHY) frame including a preamble and a data field, wherein
    the preamble includes:
        a Legacy Short Training Field (L-STF);
        a Legacy Long Training Field (L-LTF) arranged immediately after the L-STF in the frame;
        a Legacy Signal Field (L-SIG) arranged immediately after the L-LTF in the frame;
        a second Signal Field related to a second communication standard specified at least after a legacy communication standard corresponding to the L-SIG arranged after the L-SIG in the frame;
        a second Short Training Field (second STF) related to the second communication standard arranged immediately after the second Signal Field in the frame; and
        a second Long Training Field (second LTF) related to the second communication standard arranged immediately after the second STF in the frame, and
    the second Signal Field includes a subfield indicating a total maximum number of spatial streams which are formed by a plurality of access point devices that cooperatively communicate with the communication device,
    wherein a maximum number of one or more spatial streams to which at least one access point apparatus of the plurality of access point devices is adaptable is communicated between the plurality of the access point devices, and
    wherein the total maximum number of spatial streams to be included in the subfield is determined based on the maximum number of one or more spatial streams being communicated, and
    wherein a used final number of streams depends on the total maximum number of spatial streams which is a sum of a maximum number of spatial streams of the plurality of access point devices compared with the maximum number of spatial streams of a single receiver device.

10. The communication device according to claim 9, wherein not less than four bits are allocated to the subfield indicating the total maximum number of spatial streams.

11. A communication device that operates as a station device, the communication device comprising:
   at least one memory; and
   at least one circuit or at least one processor that executes instructions stored in the memory,
   wherein the at least one circuit, the at least one processor or the combination of the at least one circuit and the at least one processor causes the communication device to perform:
   receiving a physical (PHY) frame including a preamble and a data field, wherein
   the preamble includes:
      a Legacy Short Training Field (L-STF);
      a Legacy Long Training Field (L-LTF) arranged immediately after the L-STF in the frame;
      a Legacy Signal Field (L-SIG) arranged immediately after the L-LTF in the frame;
      a second Signal Field related to a second communication standard specified at least after a legacy communication standard corresponding to the L-SIG arranged after the L-SIG in the frame;
      a third Signal Field related to the second communication standard arranged immediately after the second Signal Field in the frame;
      a second Short Training Field (second STF) related to the second communication standard arranged immediately after the third Signal Field in the frame; and
      a second Long Training Field (second LTF) related to the second communication standard arranged immediately after the second STF in the frame, and
   the third Signal Field includes a subfield indicating a total maximum number of spatial streams which are formed by a plurality of access point devices that cooperatively communicate with the communication device,
   wherein a maximum number of one or more spatial streams to which at least one access point apparatus of the plurality of access point devices is adaptable is communicated between the plurality of the access point devices,
   wherein the total maximum number of spatial streams to be included in the subfield is determined based on the maximum number of one or more spatial streams being communicated, and
   wherein a used final number of streams depends on the total maximum number of spatial streams which is a sum of a maximum number of spatial streams of the plurality of access point devices compared with the maximum number of spatial streams of a single receiver device.

12. The communication device according to claim 11, wherein not less than four bits are allocated to the subfield indicating the total maximum number of spatial streams.

13. A communication method for a communication device configured as an access point device to transmit a physical (PHY) frame including a preamble and a data field, wherein the preamble includes:
   a Legacy Short Training Field (L-STF);
   a Legacy Long Training Field (L-LTF) arranged immediately after the L-STF in the frame;
   a Legacy Signal Field (L-SIG) arranged immediately after the L-LTF in the frame;
   a second Signal Field related to a second communication standard specified at least after a legacy communication standard corresponding to the L-SIG arranged after the L-SIG in the frame;
   a second Short Training Field (second STF) related to the second communication standard arranged immediately after the second Signal Field in the frame; and
   a second Long Training Field (second LTF) related to the second communication standard arranged immediately after the second STF in the frame, and
   the second Signal Field includes a subfield indicating a total maximum number of spatial streams which are formed by a plurality of access point devices including the communication device and at least one other access point device that cooperatively communicate with a single receiver device,
   wherein the total maximum number of spatial streams to be included in the subfield is determined based on a maximum number of the one or more spatial streams to which the communication device is adaptable and a maximum number of the one or more spatial streams to which the at least one other access point device is adaptable, and
   wherein a used final number of streams depends on the total maximum number of spatial streams which is a sum of a maximum number of spatial streams of the plurality of access point devices compared with the maximum number of spatial streams of the single receiver device.

14. A communication method for a communication device as an access point device configured to transmit a physical (PHY) frame including a preamble and a data field, wherein the preamble includes:
   a Legacy Short Training Field (L-STF);
   a Legacy Long Training Field (L-LTF) arranged immediately after the L-STF in the frame;
   a Legacy Signal Field (L-SIG) arranged immediately after the L-LTF in the frame;
   a second Signal Field related to a second communication standard specified at least after a legacy communication standard corresponding to the L-SIG arranged after the L-SIG in the frame;
   a third Signal Field related to the second communication standard arranged immediately after the second Signal Field in the frame;
   a second Short Training Field (second STF) related to the second communication standard arranged immediately after the third Signal Field in the frame; and
   a second Long Training Field (second LTF) related to the second communication standard arranged immediately after the second STF in the frame, and
   the third Signal Field includes a subfield indicating a total maximum number of spatial streams which are formed by a plurality of access point devices including the communication device and at least one other access point device that cooperatively communicate with a single receiver device,
   wherein the total maximum number of spatial streams to be included in the subfield is determined based a maximum number of the one or more spatial streams to which the communication device is adaptable and a maximum number of the one or more spatial streams to which at least one other access point device is adaptable, and
   wherein a used final number of streams depends on the total maximum number of spatial streams which is a sum of a maximum number of spatial streams of the plurality of access point devices compared with the maximum number of spatial streams of the single receiver device.

15. A communication method for a communication device configured to operate as a station device and to receive a physical (PHY) frame including a preamble and a data field, wherein the preamble includes:
a Legacy Short Training Field (L-STF);
a Legacy Long Training Field (L-LTF) arranged immediately after the L-STF in the frame;
a Legacy Signal Field (L-SIG) arranged immediately after the L-LTF in the frame;
a second Signal Field related to a second communication standard specified at least after a legacy communication standard corresponding to the L-SIG arranged after the L-SIG in the frame;
a second Short Training Field (second STF) related to the second communication standard arranged immediately after the second Signal Field in the frame; and
a second Long Training Field (second LTF) related to the second communication standard arranged immediately after the second STF in the frame, and the second Signal Field includes a subfield indicating a total maximum number of spatial streams which are formed by a plurality of access point devices that cooperatively communicate with the communication device, wherein a maximum number of one or more spatial streams to which at least one access point apparatus of the plurality of access point devices is adaptable is communicated between the plurality of the access point devices, wherein the total maximum number of spatial streams to be included in the subfield is determined based on the maximum number of the one or more spatial streams being communicated, and wherein a used final number of streams depends on the total maximum number of spatial streams which is a sum of a maximum number of spatial streams of the plurality of access point devices compared with the maximum number of spatial streams of a single receiver device.

16. A communication method for a communication device configured to operate as a station device and to receive a physical (PHY) frame including a preamble and a data field, wherein the preamble includes:
a Legacy Short Training Field (L-STF);
a Legacy Long Training Field (L-LTF) arranged immediately after the L-STF in the frame;
a Legacy Signal Field (L-SIG) arranged immediately after the L-LTF in the frame;
a second Signal Field related to a second communication standard specified at least after a legacy communication standard corresponding to the L-SIG arranged after the L-SIG in the frame;
a third Signal Field related to the second communication standard arranged immediately after the second Signal Field in the frame;
a second Short Training Field (second STF) related to the second communication standard arranged immediately after the third Signal Field in the frame; and
a second Long Training Field (second LTF) related to the second communication standard arranged immediately after the second STF in the frame, and the third Signal Field includes a subfield indicating a total maximum number of spatial streams which are formed by a plurality of access point devices that cooperatively communicate with the communication device, wherein a maximum number of one or more spatial streams to which at least one access point apparatus of the plurality of access point devices is adaptable is communicated between the plurality of the access point devices, wherein the total maximum number of spatial streams to be included in the subfield is determined based on the maximum number of the one or more spatial streams being communicated, and wherein a used final number of streams depends on the total maximum number of spatial streams which is a sum of a maximum number of spatial streams of the plurality of access point devices compared with the maximum number of spatial streams of a single receiver device.

17. A non-transitory computer-readable storage medium that stores a program for causing a communication device as an access point device to transmit a physical (PHY) frame including a preamble and a data field, wherein the preamble includes:
a Legacy Short Training Field (L-STF);
a Legacy Long Training Field (L-LTF) arranged immediately after the L-STF in the frame;
a Legacy Signal Field (L-SIG) arranged immediately after the L-LTF in the frame;
a second Signal Field related to a second communication standard specified at least after a legacy communication standard corresponding to the L-SIG arranged after the L-SIG in the frame;
a second Short Training Field (second STF) related to the second communication standard arranged immediately after the second Signal Field in the frame; and
a second Long Training Field (second LTF) related to the second communication standard arranged immediately after the second STF in the frame, and the second Signal Field includes a subfield indicating a total maximum number of spatial streams which are formed by a plurality of access point devices including the communication device and at least one other access point device that cooperatively communicate with a single receiver device, wherein the total maximum number of spatial streams to be included in the subfield is determined based on a maximum number of the one or more spatial streams to which the communication device is adaptable and a maximum number of the one or more spatial streams to which the at least one other access point device is adaptable, and wherein a used final number of streams depends on the total maximum number of spatial streams which is a sum of a maximum number of spatial streams of the plurality of access point devices compared with the maximum number of spatial streams of the single receiver device.

18. A non-transitory computer-readable storage medium that stores a program for causing a communication device as an access point device to transmit a physical (PHY) frame including a preamble and a data field, wherein
the preamble includes:
a Legacy Short Training Field (L-STF);
a Legacy Long Training Field (L-LTF) arranged immediately after the L-STF in the frame;
a Legacy Signal Field (L-SIG) arranged immediately after the L-LTF in the frame;
a second Signal Field related to a second communication standard specified at least after a legacy communication standard corresponding to the L-SIG arranged after the L-SIG in the frame;
a third Signal Field related to the second communication standard arranged immediately after the second Signal Field in the frame;
a second Short Training Field (second STF) related to the second communication standard arranged immediately after the third Signal Field in the frame; and
a second Long Training Field (second LTF) related to the second communication standard arranged immediately after the second STF in the frame, and
the third Signal Field includes a subfield indicating a total maximum number of spatial streams which are formed by a plurality of access point devices including the communication device and at least one other access point device that cooperatively communicate with a single receiver device,
wherein the total maximum number of spatial streams to be included in the subfield is determined based on a maximum number of the one or more spatial streams to which the communication device is adaptable and a maximum number of the one or more spatial streams to which the at least one other access point device is adaptable, and
wherein a used final number of streams depends on the total maximum number of spatial streams which is a sum of a maximum number of spatial streams of the plurality of access point devices compared with the maximum number of spatial streams of the single receiver device.

19. A non-transitory computer-readable storage medium that stores a program for causing a communication device as a station device to receive a physical (PHY) frame including a preamble and a data field, wherein
the preamble includes:
a Legacy Short Training Field (L-STF);
a Legacy Long Training Field (L-LTF) arranged immediately after the L-STF in the frame;
a Legacy Signal Field (L-SIG) arranged immediately after the L-LTF in the frame;
a second Signal Field related to a second communication standard specified at least after a legacy communication standard corresponding to the L-SIG arranged after the L-SIG in the frame;
a second Short Training Field (second STF) related to the second communication standard arranged immediately after the second Signal Field in the frame; and
a second Long Training Field (second LTF) related to the second communication standard arranged immediately after the second STF in the frame, and
the second Signal Field includes a subfield indicating a total maximum number of spatial streams which are formed by a plurality of access point devices that cooperatively communicate with the communication device,
wherein a maximum number of one or more spatial streams to which at least one access point apparatus of the plurality of access point devices is adaptable is communicated between the plurality of the access point devices,
wherein the total maximum number of spatial streams to be included in the subfield is determined based on the maximum number of the one or more spatial streams being communicated, and
wherein a used final number of streams depends on the total maximum number of spatial streams which is a sum of a maximum number of spatial streams of the plurality of access point devices compared with the maximum number of spatial streams of a single receiver device.

20. A non-transitory computer-readable storage medium that stores a program for causing a communication device as a station device to receive a physical (PHY) frame including a preamble and a data field, wherein
the preamble includes:
a Legacy Short Training Field (L-STF);
a Legacy Long Training Field (L-LTF) arranged immediately after the L-STF in the frame;
a Legacy Signal Field (L-SIG) arranged immediately after the L-LTF in the frame;
a second Signal Field related to a second communication standard specified at least after a legacy communication standard corresponding to the L-SIG arranged after the L-SIG in the frame;
a third Signal Field related to the second communication standard arranged immediately after the second Signal Field in the frame;
a second Short Training Field (second STF) related to the second communication standard arranged immediately after the third Signal Field in the frame; and
a second Long Training Field (second LTF) related to the second communication standard arranged immediately after the second STF in the frame, and
the third Signal Field includes a subfield indicating a total maximum number of spatial streams which are formed by a plurality of access point devices that cooperatively communicate with the communication device,
wherein a maximum number of one or more spatial streams to which at least one access point apparatus of the plurality of access point devices is adaptable is communicated between the plurality of the access point devices,
wherein the total maximum number of spatial streams to be included in the subfield is determined based on the maximum number of the one or more spatial streams being communicated, and
wherein a used final number of streams depends on the total maximum number of spatial streams which is a sum of a maximum number of spatial streams of the plurality of access point devices compared with the maximum number of spatial streams of a single receiver device.

* * * * *